(12) United States Patent
Jordil et al.

(10) Patent No.: US 7,281,433 B2
(45) Date of Patent: Oct. 16, 2007

(54) PROBE FOR THREE-DIMENSIONAL MEASUREMENTS

(75) Inventors: Pascal Jordil, Ecoteaux (CH); Claude Rouge, Baulmes (CH); Leonard Wunderlin, Renens (CH); Adriano Zanier, Prilly (CH)

(73) Assignee: TESA SA, Renens (CH)

( * ) Notice: Subject to any disclaimer, the term of this patent is extended or adjusted under 35 U.S.C. 154(b) by 167 days.

(21) Appl. No.: 11/178,706

(22) Filed: Jul. 11, 2005

(65) Prior Publication Data

US 2006/0005633 A1    Jan. 12, 2006

(30) Foreign Application Priority Data

Jul. 12, 2004    (EP) .................................. 04103304

(51) Int. Cl.
*G01N 3/08*    (2006.01)
(52) U.S. Cl. .................. 73/818; 73/865.5; 33/556; 33/572
(58) Field of Classification Search ............ 73/818, 73/866.5; 33/556, 572
See application file for complete search history.

(56) References Cited

U.S. PATENT DOCUMENTS

| | | | |
|---|---|---|---|
| 5,084,981 A * | 2/1992 | McMurtry et al. ............ 33/556 |
| 5,088,337 A * | 2/1992 | Bennett ..................... 73/866.5 |
| 6,634,114 B2 * | 10/2003 | Bidwell ..................... 33/542 |
| 6,760,977 B2 * | 7/2004 | Jordil et al. ................. 33/558 |
| 6,854,195 B2 * | 2/2005 | Jordil et al. ................. 33/556 |
| 6,907,673 B2 * | 6/2005 | Zanier et al. ................ 33/561 |
| 6,938,353 B2 * | 9/2005 | Rouge et al. ................ 33/561 |
| 7,036,239 B2 * | 5/2006 | Jordil et al. ................. 33/561 |
| 2001/0025427 A1 | 10/2001 | Lotze et al. |
| 2003/0101609 A1 * | 6/2003 | Jordil et al. ................. 33/558 |

FOREIGN PATENT DOCUMENTS

EP    0 392 660    10/1990

\* cited by examiner

*Primary Examiner*—Edward Lefkowitz
*Assistant Examiner*—Freddie Kirkland, III
(74) *Attorney, Agent, or Firm*—Pearne & Gordon LLP

(57) ABSTRACT

Touch probe including a fixed part (250), designed to be fastened onto a measuring machine or a machine tool, and a contact feeler (30) that is mobile and orientable on two independent axes (211, 212) along a multiplicity of directions indexed in space. An actuator (300) comprising anti-friction rollers and a ball bearing allows the rotation axes (211) to be unlocked and any orientation to be selected with minimized friction. In locked position, the actuator (300) withdraws under the action of return springs (336) so as not to influence the indexing accuracy.

20 Claims, 7 Drawing Sheets

PROBE FOR THREE-DIMENSIONAL MEASUREMENTS

REFERENCE DATA

This application claims priority from European patent application 2004EP-103304 filed on Jul. 12, 2004, the contents whereof are hereby incorporated by reference.

FIELD OF THE INVENTION

The present invention concerns a touch probe capable of being oriented in space along a multiplicity of directions. This probe is designed to be used more particularly, but not exclusively, in a manual or automatic measuring machine or in a machine tool such as for example a milling machine, for the three-dimensional measuring of a machined part or during machining.

DESCRIPTION OF RELATED ART

Touch probes are measuring elements used widely, but not uniquely, on production lines of mechanical parts, for example for accurately checking dimensions or surfaces of mechanical parts. Touch probes are also used for three-dimensional measuring of pieces of complex shape, in order to reproduce or model them.

Touch probes generally comprise a fixed part, designed to be fastened onto a measuring machine or on a machine tool, and a mobile feeler, comprising a sphere at the end of an elongated rod and designed to be brought into contact with the piece to be measured.

In most applications, touch probes are fastened on the mobile arm of a machine whose position can be determined accurately by means of a manual or automatic measuring system, such as for example position encoders placed on the axes of the machine. The mobile arm is moved in space until the probe's measuring feeler comes into contact with the piece or the surface to be measured. During contact, a deflective force is thus applied on the feeler, moving it away from its initial resting position. A sensor reacts to the slightest displacement of the feeler, generating an electric signal that is sent either to the user, in the form of a light signal, or to the machine's control software which thus determines, on the basis of the data of the measuring system, the coordinates of the contact point within a given reference frame. For this purpose, the prior art uses electromechanical or optical sensors or movement sensors based on different principles, for example sensors comprising constraint gauges.

In the case of a three-dimensional touch probe, the connection between the feeler and the probe's fixed part is usually realized according to the principle of the Boys connection, i.e. for example by three cylindrical pins resting on six spheres so as to define six contact points between the fixed organ and the feeler. Two- and one-dimensional probes are however also known.

When the probe is used for measuring pieces of complex shape, having cavities and protuberances, it is difficult or even impossible to bring the feeler into contact with the entire surface of the piece without the probe's fixed part or the feeler's rod interfering with elements of the piece to be measured. To remedy this inconvenience, probes are known that allow the contact feeler to be oriented in a plurality of directions in space. Generally, two independent rotation axes are required to cover all the possible orientations. A probe of this type is described in European patent application EP0392660.

The rotation axes are preferably indexed, meaning that a sufficiently large but finite number of predetermined and accurately reproducible resting positions are provided. This arrangement avoids the measuring machine having to be re-calibrated after each change in orientation of the feeler.

During measuring, the axes allowing the above prior art probe to be oriented are locked in one of the provided indexed positions. When a different orientation of the probe is required, the operator must manually unlock the axes by actuating a wheel or a lever provided to this effect, orient the probe as required, and lock again the axes by repositioning the wheel or lever in the initial locking position. These operations can cause positioning errors, for example following an inadvertent movement of the first axis while positioning the second one.

Another disadvantage of the probe described here above is that the locking and unlocking operations require an external torque to be applied on the locking wheel which is transmitted by the probe and its support to the mobile arm of the measuring machine. This net torque produces mechanical loads on the probe's support and can cause the whole probe to move. To avoid this inconvenience, the operator must hold the probe motionless when he actuates the locking wheel, which makes the operation with a one hand difficult or even impossible.

One aim of the present invention is to propose a touch probe capable of being oriented in a multiplicity of indexed directions and that can be positioned reliably without risk of positioning errors.

Another aim of the present invention is to propose a touch probe without the limitations of the prior art.

Another aim of the present invention is to propose a touch probe capable of being oriented in a multiplicity of indexed direction and that can be operated more easily than the prior art probes.

BRIEF SUMMARY OF THE INVENTION

According to the invention, these aims are achieved by the device being the object of the main claim, the dependent claims illustrating optional characteristics of the invention.

BRIEF DESCRIPTION OF THE DRAWINGS

The present invention will be better understood by reading the description given by way of example and illustrated by the attached figures.

DETAILED DESCRIPTION OF POSSIBLE EMBODIMENTS OF THE INVENTION

Figure 1:
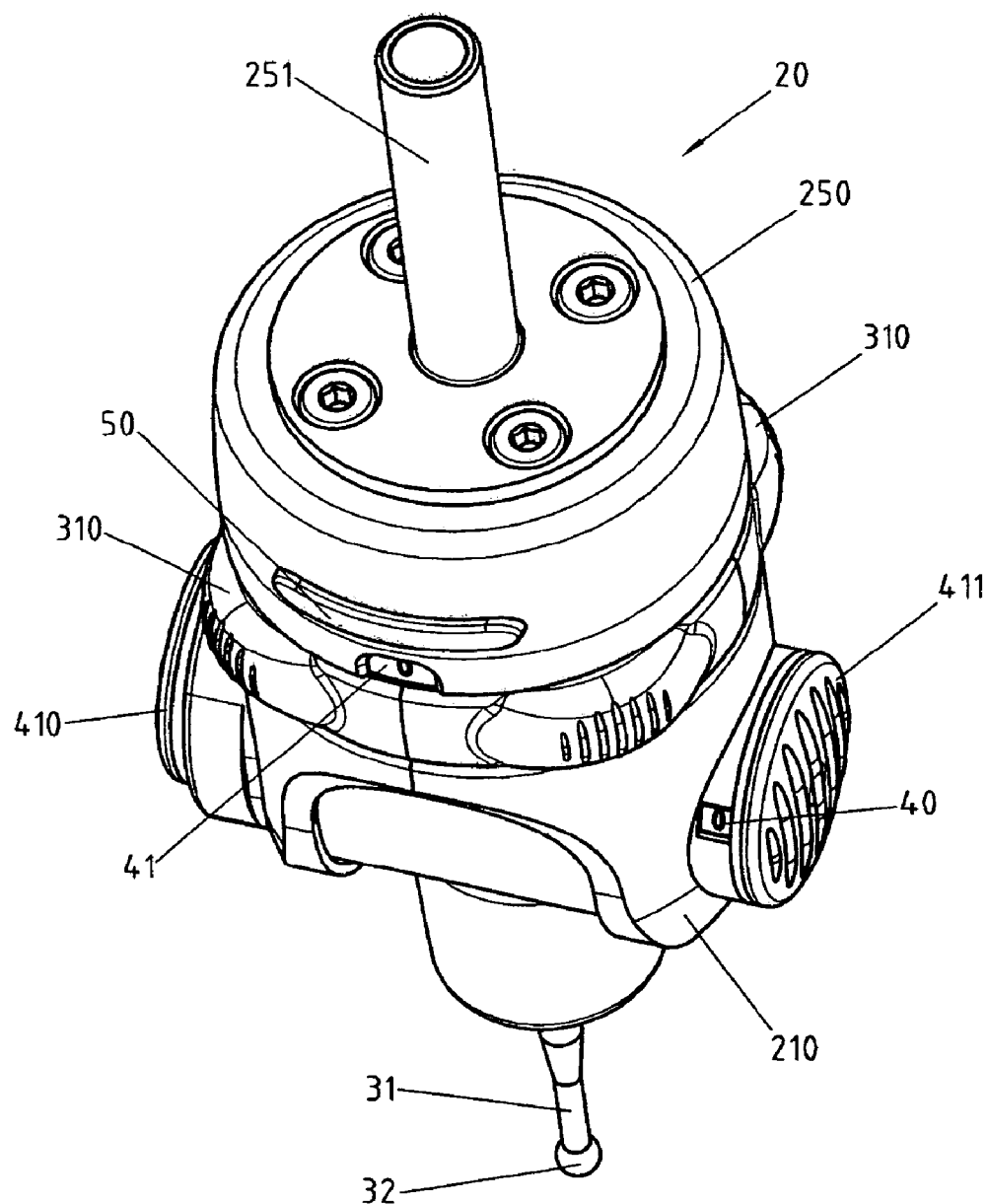
FIG. 1 shows an embodiment of a touch probe according to the invention.
Figure 5:
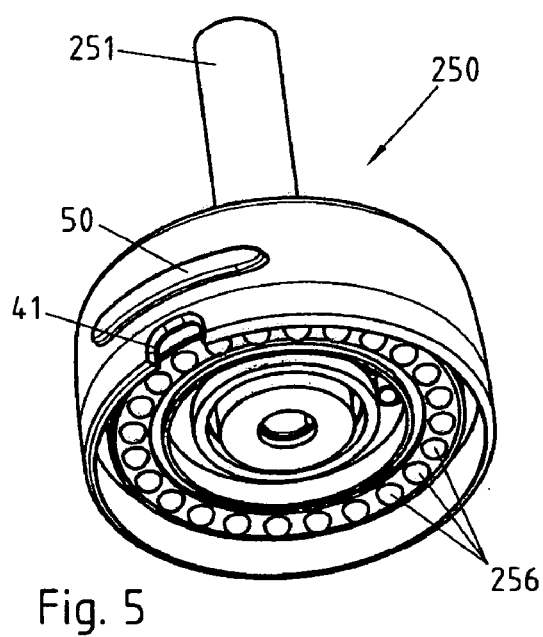
FIG. 5 represents a fixed part of the probe of FIG. 1.

The first embodiment of the invention represented in FIG. 1 is a touch probe 20 comprising a fixed part 250, represented in detail in FIG. 5, designed to be fastened to the mobile arm of a measuring machine by the threaded rod 251 or by other known fastening means.

The fixed part 250 has on its lower face 24 spheres 256, regularly spaced along a circumference and partially protruding downwards. The spheres 256 define 24 indexed positions spaced by 15 degrees for a first rotation axis of the probe, as will be explained further below.

According to the application, the inventive probe can be used with any orientation in space. For the sake of convenience, with reference to FIG. 2, the term "vertical" will be used hereinafter to designate the first rotation axis of the probe 211, corresponding to a geometric axis of the probe, and the term "horizontal" for the second axis 212, orthogonal thereto. These terms refer to the conventional orientation used in the figures, and notably in FIG. 2 on which the two axes 211 and 212 are represented.

For the sake of convenience, the two axes and various elements of the probe will also be referred to hereinafter with the terms "first" and "second". These terms must however not be understood in the sense that the invention is restricted to a device with two axes, as the invention also comprises probes with one, three or any number of rotation axes. The terms "first" and "second" also do not imply any kind or order or subordination relation between the elements, and are used here merely as indicators for distinguishing the elements of the inventive device.

Figure 6:
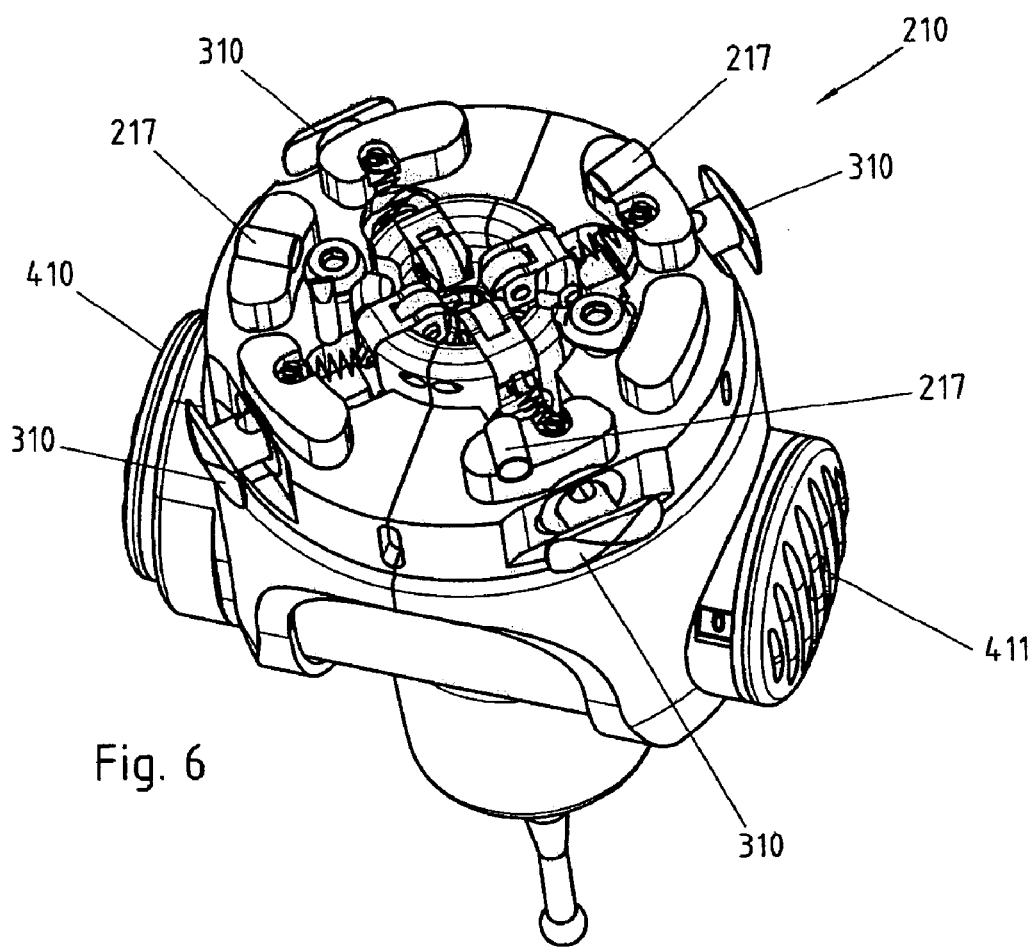
FIG. 6 illustrates a mobile part around a first vertical axis of the probe of FIG. 1.
Figure 7:
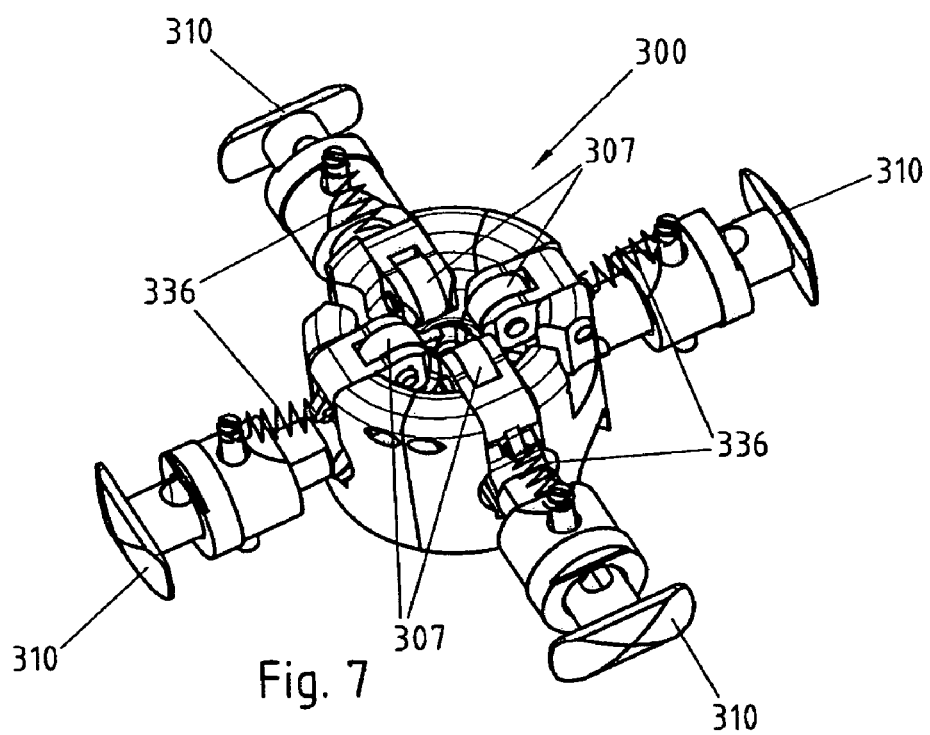
FIG. 7 shows an indexing and demultiplying mechanism used to disengage a first vertical axis of the probe of FIG. 1.
Figure 8:
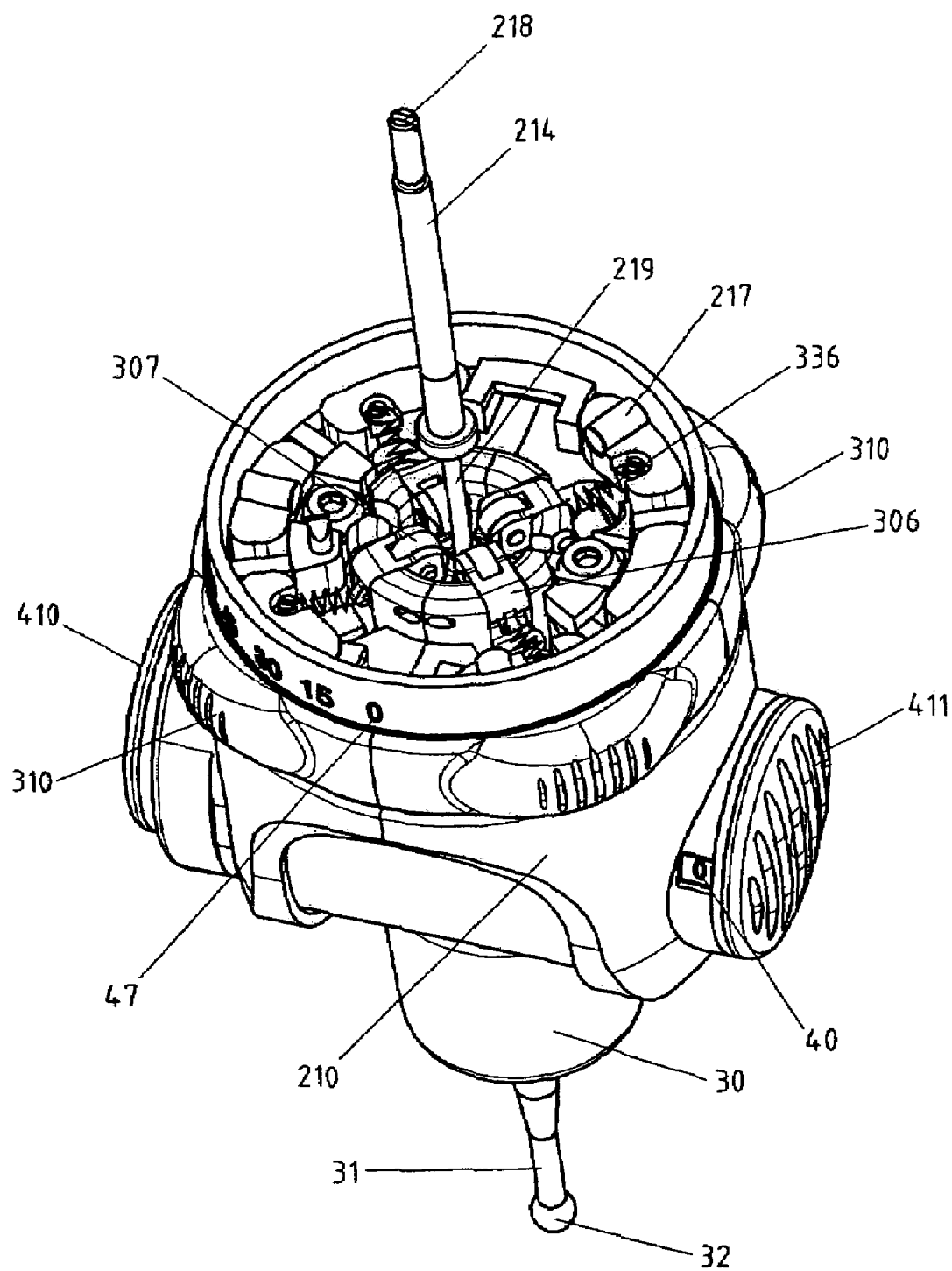
FIG. 8 represents the probe of FIG. 1 at partial stage of its assembly.

The mobile element 210, represented in FIGS. 6 and 8, bears on its upper face three cylindrical pins 217. The helical spring 235, visible in FIG. 9, pulls the mobile element 210 against the fixed element 250 through the rod 219. In this situation, each of the pins 217 rests on two of the spheres 256, the six resulting contact points determining the relative position of the elements 250 and 210 in an accurate and reproducible fashion.

In view of the rotational symmetry of the fixed element, the mobile element 20 can take up 24 indexed positions, spaced by 15 degrees from one another, around the first rotation axis 211, which corresponds to the probe's geometric axis. The same result could have been achieved by other equivalent arrangements, for example by placing the spheres on the mobile element and the pins on the fixed element, or by replacing the spherical or cylindrical surfaces of the pins or of the spheres by inclined planes, or also by using six cylindrical pins having each only a single contact point with one of the spheres. It would also be possible to replace the flat spring 235 by an equivalent resilient organ, for example a spring blade or by an element made of a resilient synthetic material.

The disengaging mechanism 300, represented in FIGS. 7, 8, 9 and 10, makes it possible to allow the mobile element 210 to rotate around the axis 211. The transmission 300 includes four levers 306, driven by the four push buttons 310, and by the four rollers 307, referenced in FIG. 7.

Figure 9:
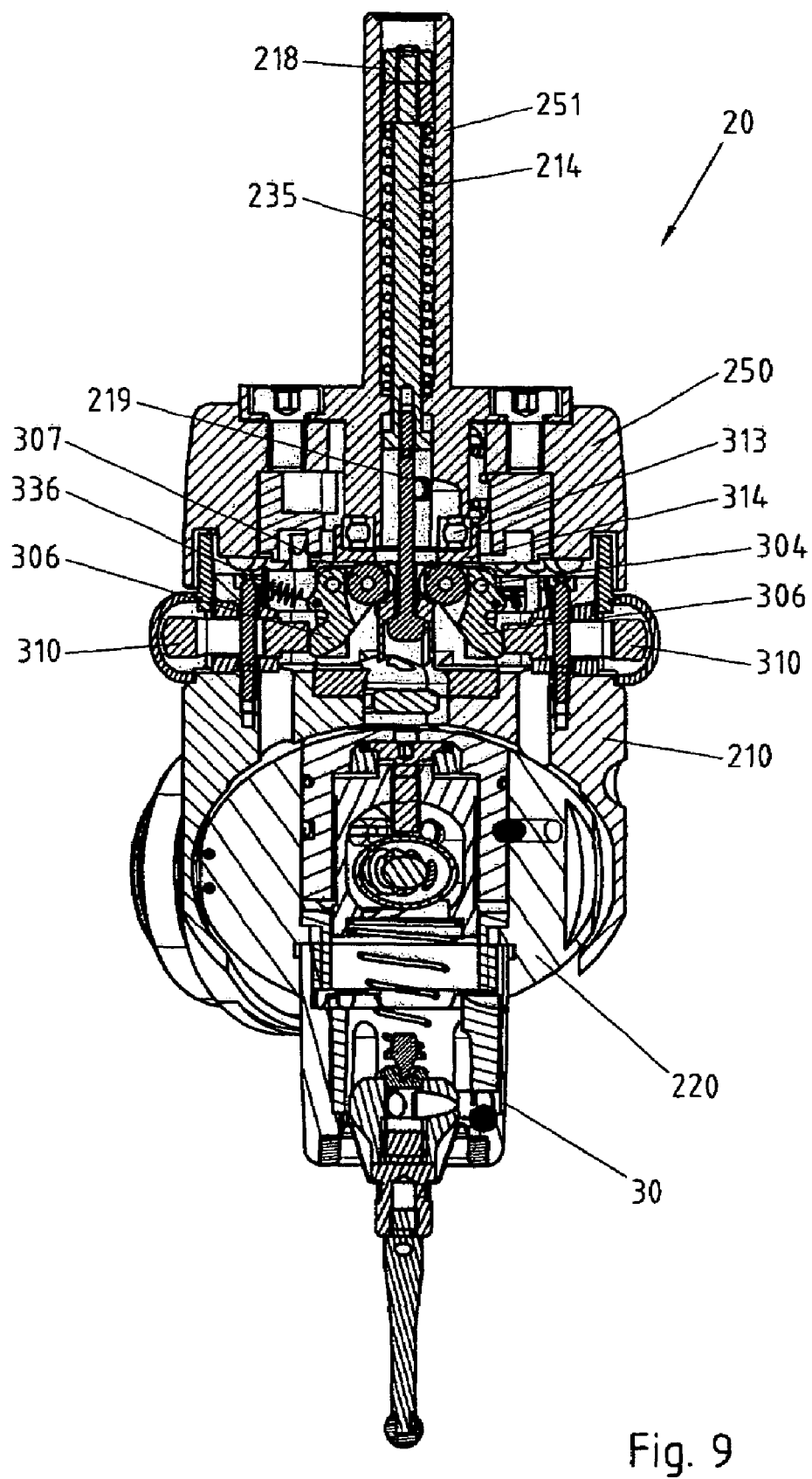
FIG. 9 shows a cross section of the probe of FIG. 1 in a locked position.
Figure 10:
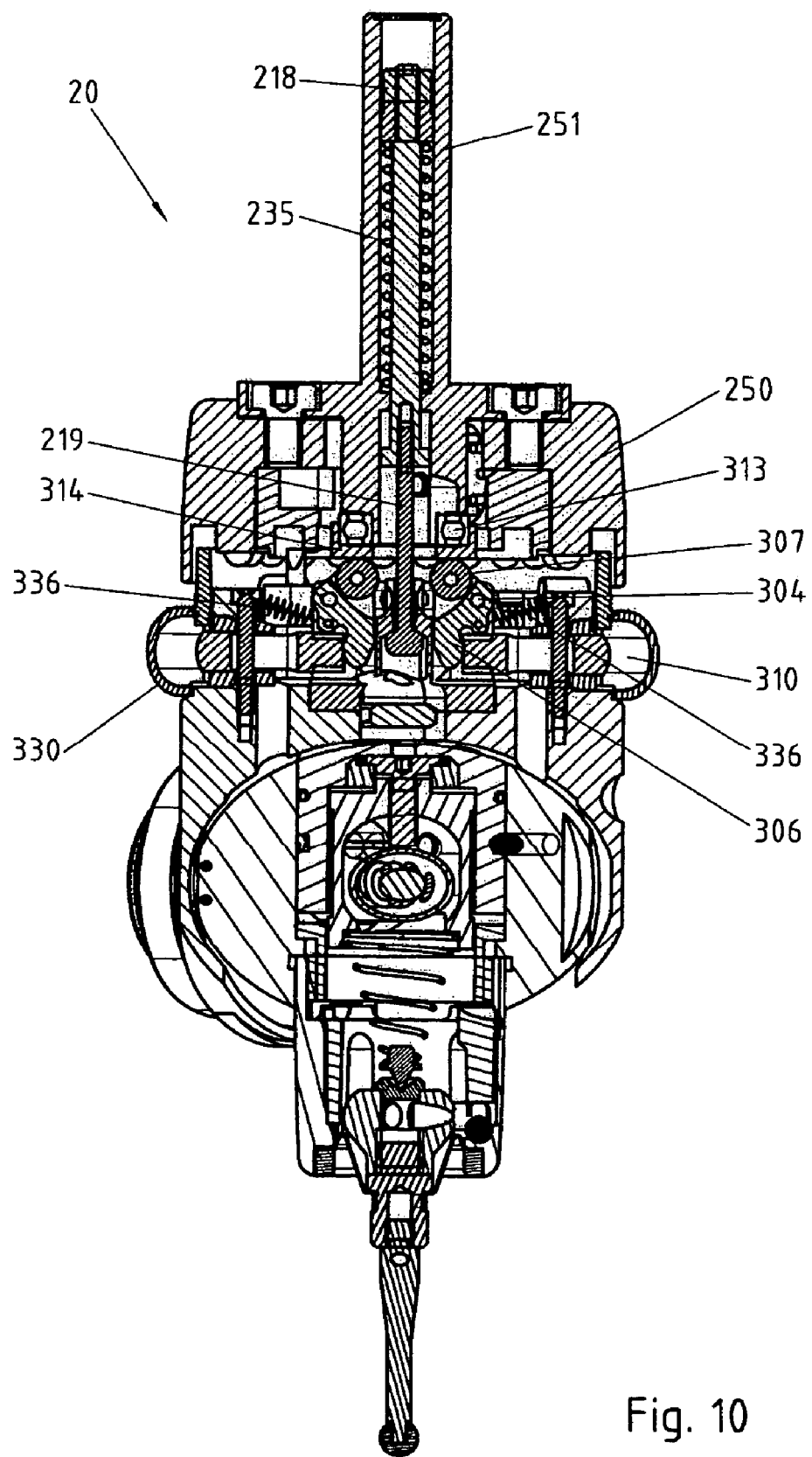
FIG. 10 shows a cross section of the probe of FIG. 1 in a disengaged position of a first vertical rotation axis.

When two opposite buttons 310 are pressed, the levers 306 turn around the pivots 304 and leave the locked position of FIG. 9 until they take up an essentially vertical position, such as represented in FIG. 10, showing the indexing mechanism of the first axis 211 in unlocked position.

In unlocked position, the rollers 307 push against the back-up ring 314 and, through the ball bearing 313, axially move the fixed element 250 away from the mobile element 210. In the position apart, the spheres 256, referenced in FIGS. 9 and 10, clear the pins 217 without touching them, and the rotation around the axis 211 is possible.

The resting force of the pins 217 on the spheres 256 must be sufficiently high to prevent any accidental movement of the mobile part 210 during measuring. In this particular embodiment, the indexing spring 235 is dimensioned for a total resting force of approximately 30 N, for example, i.e. about 10 N for each of the six contact points, since the pressure is exerted at 60 degrees relatively to the axis.

It would be difficult to apply a force of 30 N directly on the buttons 310. For this reason, the dimensions of the levers 306 and the position of the pivots 304 are chosen to give a sufficient demultiplication ratio between the radial force exerted on the buttons 310 and the axial force which opposes the elasticity of the spring 235. A reduction ratio of 1:2, for example, implies an actuating force at the buttons 310 of about 15N, i.e. approximately 1.5 Kgf, which the user can exert without great difficulty. The travel range of the buttons 310 remains contained, with this reduction ratio, to several millimeters.

The numeric values given here above must be interpreted as examples that are particularly suited to the presented embodiment. It would be possible to chose different values according to circumstances, for example according to the mass and the dimensions of the probe.

To ensure that the mobile element 210 is disengaged around the rotation axis 211, it is necessary to actuate simultaneously two opposite buttons 310. In this manner, the external forces exerted on the probe are essentially in opposition and perpendicular to the rotation axis 211, the resulting force and torque are essentially zero and any unintentional movement of the probe is prevented.

While the buttons 310 are pushed along the radial direction, the operator can make the mobile element 210 turn around the axis 211 by actuating the same buttons in tangential direction. This operation is very intuitive and can easily be performed with two fingers of one hand. In this condition, the distance apart between the spheres 256 and the pins 217 is sufficient to avoid any contact or friction of the indexing surfaces, thus maintaining the positioning accuracy in indexed position. It is thus not necessary to release the buttons 310 to pass from the unlocking to the probe's rotation and then to locking of the probe again.

The reduction ratio and the friction coefficients of the used materials will be chosen so that the transmission 300 is reversible, so that the mobile element 210 spontaneously returns to indexed position once the pressure on the buttons 310 is released, thus avoiding an accidental use in the disengaged position.

The force moving apart the fixed element 250 and the mobile element 210 generated by the transmission 300 is generally aligned and opposed to the force exerted by the indexing spring 235 and transmitted by the rods 214 and 219, so as to ensure a frictionless rotation in the disengaged position.

Advantageously, a bearing 313, for example a thrust ball bearing, is interposed between the fixed element 250 and the mobile element 210, so as to reduce friction during rotation around the first axis 211. Another type of bearing, for example ball or roller bearing, could also be used instead of a thrust ball bearing.

In the locked position, visible in FIG. 9, the rollers 307 are moved away from the back-up ring 314 by the return springs 336. A small clearance (not visible) exists between the rollers 307 and the back-up ring 314 whatever the probe's orientation in space.

In this manner, in resting position, only the six contact points between the balls 256 and the pins 217 constitute the reaction to the action of the indexing spring 235. No other part, that could create any kind of constraint, inevitably negative for the accuracy, stays in contact between the fixed element 250 and the mobile element 210.

The force of the indexing spring, moreover, is applied by the rods 214 and 219 exactly at the center of gravity of said six contact points and corresponding to the rotation axis 211, to ensure optimum resting.

The indexing spring 235 is preferably lodged inside the support rod 251 in order to be able to use a very long spring, thus of weak rigidity, which ensures a constant traction force along the entire travel range. The indexing force can easily be adjusted by using the screw 218 at the end of the support rod, or by another equivalent means. The screw 218 is easily accessible from outside without disassembling the probe, by simply opening the lid 252 for example.

Figure 2:
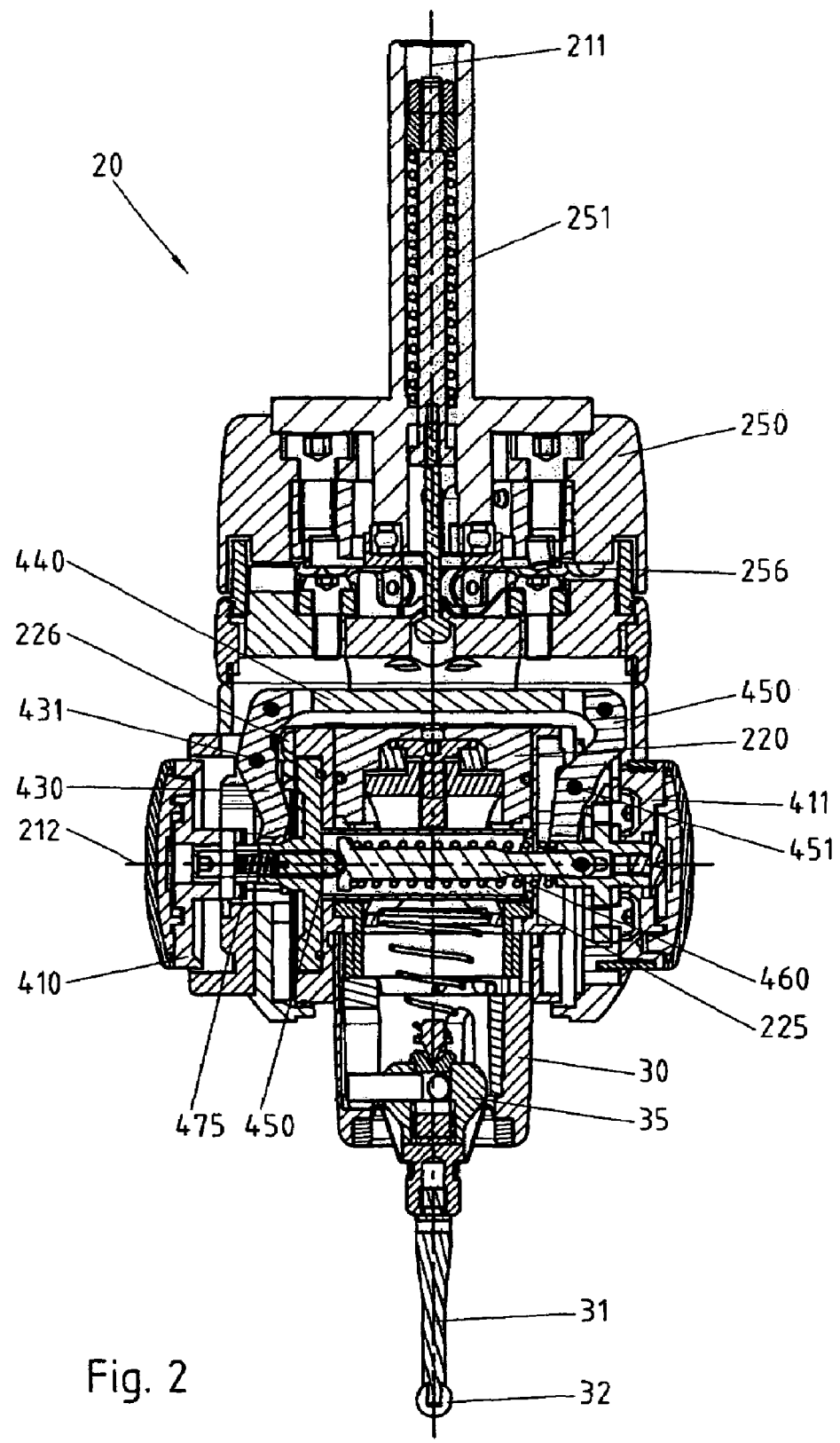
FIG. 2 shows a cross section of the touch probe of the invention represented in FIG. 1.

The first mobile element 210 is connected to a second mobile element 220 capable of turning around the rotation axis 212, perpendicular to the first rotation axis 211, to which a trigger 30 of known type is fastened as can be seen in FIG. 2.

The second mobile element 220 is pushed against the first mobile element 210, in the axial direction defined by the rotation axis 212, by the compression spring 225. A crown of spheres 226 is made on a vertical face of the mobile element 220 and interacts with three cylindrical pins (not represented in the figure) placed on the face adjacent to the first mobile element 210 to define a predetermined number of exactly reproducible indexing positions, in analog fashion to that explained here above for the rotation of the first mobile element 210.

In a possible variant embodiment, six cylindrical pins having only a single contact point can be used.

Figure 3:
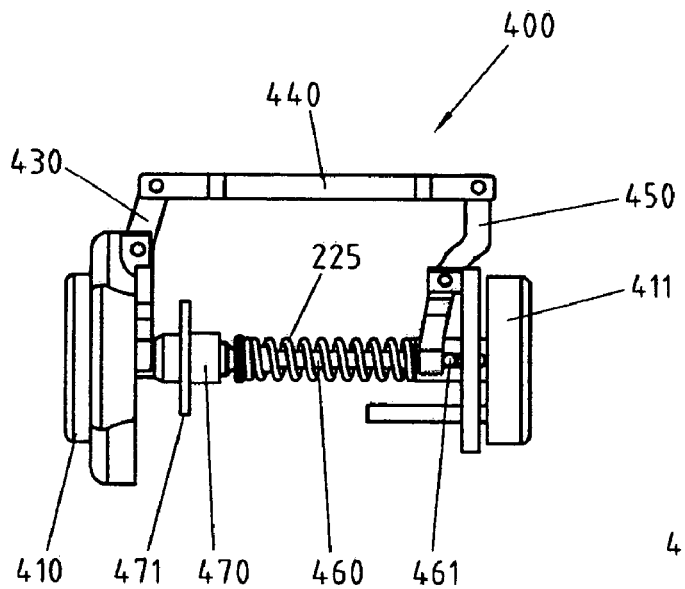
FIGS. 3 and 4 show the indexing and demultiplying mechanism used to disengage a second horizontal axis of the probe of FIG. 1.
Figure 4:
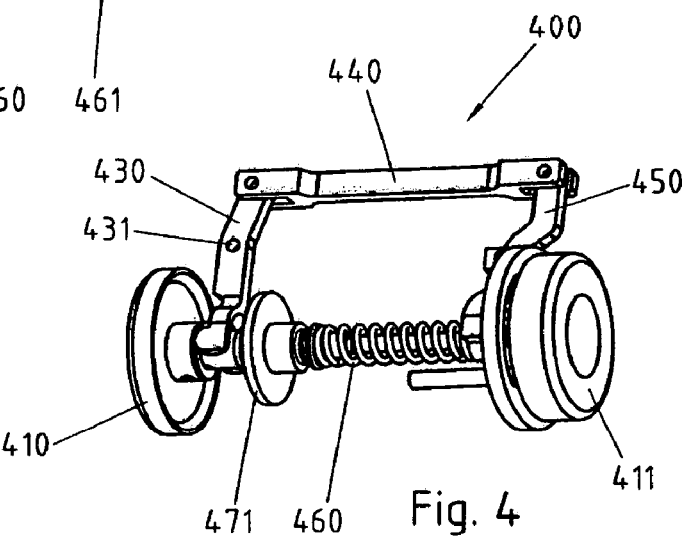

The disengaging and rotation system 400 of the second mobile element 220 is represented in FIGS. 3 and 4. The disengaging is effected by applying pressure on the two buttons 411 and 410. The axial force applied on the button 410 that can slide axially around the part 470 is transmitted by the two levers 430 and 450 and the horizontal arm 440, is multiplied and applied to the spring 225 by the pin 461 and the rod 460, in order to compress it, which cancels the contact force between 220 and 210. In this embodiment, the dimensions of the arms of the levers 430, 450 are chosen so as to achieve an operating force reduction ratio of 1:2, for example, as for the first mobile element 210. A second spring 475, interposed between the button 410 and the part 470, axially pushes to the right on FIG. 2 the second mobile element 220 while allowing it to rotate.

When the button 410 is pushed, the second mobile element 220 is displaced to the right of FIG. 2, so that the pins and the indexing spheres 226 no longer touch, and the second mobile element 220 can turn around the axis 212. The rotation is effected by the operator through the button 410 that is united angularly to the part 470 by a pin, not visible in the figures.

The button 411, opposed to the button 410, has the two-fold function of offering a resting surface to the finger to exert a force opposed to that applied on the button 410, and of facilitating the rotation of the element 220 with two fingers. The button 411 is in fact united angularly to the element 220 and driven in rotation with it. Use of two forces essentially opposed to one another makes it possible to avoid efforts being transmitted to the probe's support and making the whole probe move.

The action of the button 410 on the second mobile element 220 through the rod 460 is substantially aligned and opposed to the force exerted by the spring 225, which ensures rectilinear movements without jamming.

The electric signal generated by the trigger 30 is sent either to the user, in the form of a light signal emitted by the light diode 50 (FIG. 1) or to the machine's control software which thus determines by means of the measuring system's data the coordinates of the contact point within a given referential frame.

The second mobile element 220 can take up, in this embodiment, 7 indexed positions spaced by 15 degrees to one another, for a total angle of 90 degrees. This angle, in combination with the possible rotation of 360 degrees for the first rotation element 210, makes it possible to orient the trigger 30 in a number of directions uniformly distributed in a half-space. It would however be possible to make the inventive device with a generic number of indexed positions and any distances between them.

With reference now to FIG. 10, the buttons 310 are surrounded by an annular rubber or elastomer protective membrane 330 whose function it is to protect the inner mechanism from dirt and dust, but also to prevent heat from the operator's hands to be transmitted to the internal indexing mechanism, which would have detrimental consequences on the indexing accuracy. For the same purpose, the buttons 410 and 411, serving for the rotation and disengagement of the second axis 212, are also preferably made of a synthetic material with good heat insulation properties.

A window 41 is provided on the support element 250 allowing the rotation angle relative to the first axis 211 to be read on a scale 47 engraved or printed on the first mobile element 210, as can be seen in FIGS. 1 and 8.

The rotation angle relative to the second axis 212 can be read on the two windows 40 cut out in the external crown of the button 411. At least two windows are necessary in this case to allow optimum visibility in all the probe's possible orientations.

The trigger 30 reacts to the slightest contact with the surface of the piece to be measured by generating an electric pulse. The pulse is transmitted, through an electronic processing circuit and a connector (not represented) for connection with the control device of the measuring machine, and to the light display 50. The display comprises in this embodiment a light diode, but could alternatively comprise other known light emitters, such as for example sheet or wire electroluminescent elements. The light diode is surmounted by an optical light diffuser, allowing the light emitted to be seen in a wider range of observation angles.

In an alternative embodiment of the invention, the display 50 is replaced by several displays, placed at different places of the probe, so that at least one display is visible from each possible observation angle.

In another embodiment of the invention, the display 50 comprises one or several light conductors to emit the light produced by one or several light sources from different places of the probe's surface, so that the light indication is visible from each possible observation angle.

The invention also includes an embodiment in which the rotation and the disengagement of the axes are actuated by automatic actuators, for example electric motors and/or solenoids.

The invention claimed is:

1. An orientable touch probe for orienting a measuring feeler relatively to a measuring apparatus, including:
    a support element;
    a mobile element connected with said support element, capable of turning around an axis relatively to said support element;
    a resilient organ located along said axis, for holding said mobile element in a locked position, preventing the mobile element from rotating when the mobile element is in the locked position;
    indexing elements defining six contact points between said support element and said mobile element, for defining a multiplicity of predetermined and reproducible angular positions for said mobile element when said mobile element is in locked position;
    an actuator opposed to said resilient organ for disengaging said mobile element from said support element, allowing said mobile element to rotate around said axis,
    wherein no other contact exists between said support element and said mobile element apart from said six contact points and said connection with said resilient organ when said mobile element is in the locked position.

2. The probe of claim 1, wherein said support element comprises a support rod for fastening said probe to said measuring apparatus and said resilient organ comprises a helical spring placed axially in an inner space of said support rod, connected to said mobile element by a rod aligned with said axis.

3. The probe of claim 1, comprising a bearing interposed between said support element and said mobile element for turning said mobile element relatively to said support element.

4. The probe of claim 3, wherein said actuator comprises rollers for exerting a moving-apart force between said mobile element and said support element through said bearing.

5. The probe of claim 1, wherein said actuator is united with said mobile element and comprises at least one return device for returning said actuator of said support element when said mobile element is in locked position.

6. The probe of claim 1, comprising a second mobile element connected with said mobile element by a second axis for turning said second mobile element relatively to said mobile element;
    a second resilient organ, that can be actuated independently from said resilient organ for holding said second mobile element in a locked position preventing said second mobile element from rotating,
    a second actuator opposed to said second resilient organ for disengaging said second mobile element from said second mobile element, allowing said second mobile element to rotate around said second axis.

7. The probe of claim 6, wherein the disengaging of said mobile element and/or of said second mobile element is effected by a displacement in the direction of said axis respectively of said second axis.

8. The probe of claim 6, wherein said actuator and/or a second actuator disengaging said mobile element respectively said second mobile element through the action of two external forces essentially symmetrical and opposed, applied to said actuator respectively to said second actuator.

9. The probe of claim 8, wherein said actuator and/or said second actuator drive in rotation said mobile element respectively said second mobile element, through the action of a couple of external forces applied to said actuator respectively to said second actuator.

10. The probe of claim 8, wherein said actuator and/or said second actuator are arranged to cease their action when the two said external symmetric and opposed forces are interrupted.

11. The probe of claim 8, wherein said actuator and/or said second actuator comprise a demultiplying mechanism for reducing the intensity of the force required for disengaging said mobile element respectively said second mobile element.

12. The probe of claim 11, wherein said demultiplying mechanism comprises at least one lever with unequal arms.

13. The probe of claim 8, wherein said two external forces have a direction essentially perpendicular to said axis and said two external forces are supported by at least two buttons placed on said probe in positions diametrically opposed relative to said axis.

14. The probe of claim 6, comprising one or several windows for indicating the angular position of said mobile element respectively of said second mobile element.

15. The probe of claim 14, comprising at least two windows for indicating the position of said second mobile element.

16. The probe of claim 6, wherein the action of said actuator on said mobile element is substantially aligned and opposed to the force exerted by said resilient element on said mobile element.

17. The probe of claim 6, wherein the action of said second actuator on said second mobile element is substantially aligned and opposed to the force exerted by said second resilient element on said second mobile element.

18. The probe of claim 1, comprising a measuring feeler fastening to said second mobile element.

19. The probe of claim 1, comprising a large-size light indication for allowing the operation of the probe to be controlled from any position of the probe.

20. The probe of claim 1, comprising a heat insulating external layer for preventing heat conduction from the hands to the probe.

* * * * *